L. D. STUART.
EMERGENCY TIRE.
APPLICATION FILED DEC. 15, 1919.
1,365,864.
Patented Jan. 18, 1921.
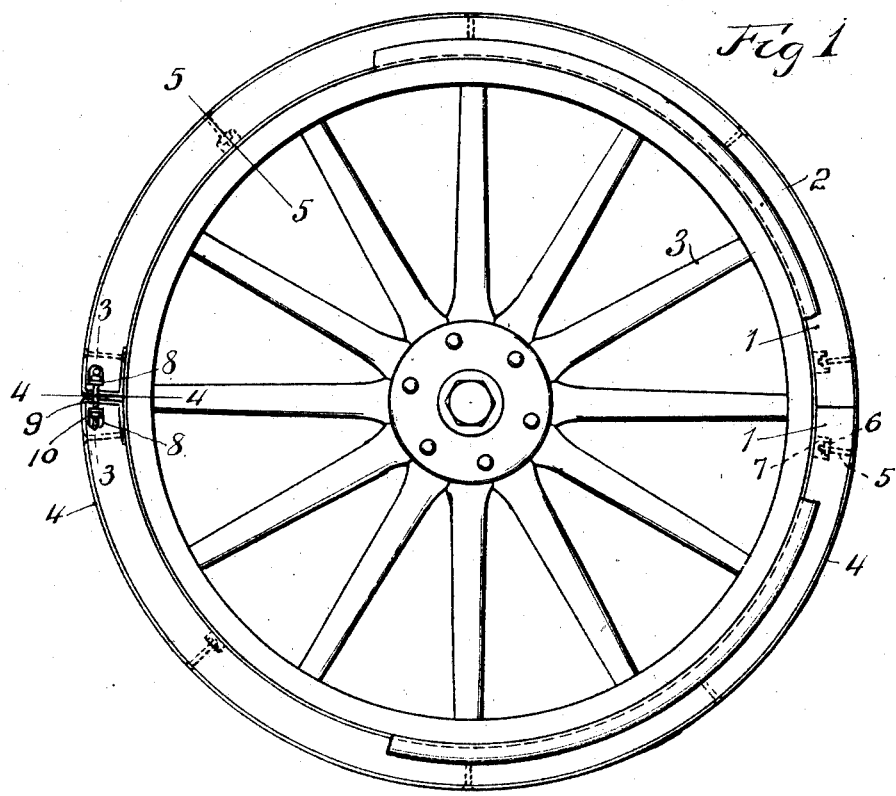
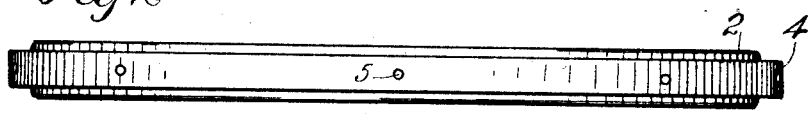
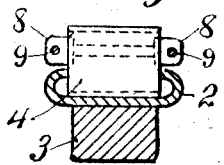
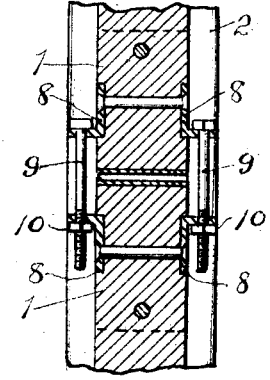
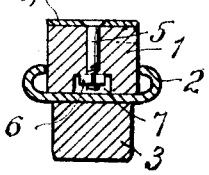
Witness:
R. R. Hamilton
Inventor,
Lovell D. Stuart
By Warren D. House
His Attorney.

UNITED STATES PATENT OFFICE.

LOVELL D. STUART, OF ROSEDALE, KANSAS.

EMERGENCY-TIRE.

1,365,864. Specification of Letters Patent. Patented Jan. 18, 1921.

Application filed December 15, 1919. Serial No. 344,937.

*To all whom it may concern:*

Be it known that I, LOVELL D. STUART, a citizen of the United States, residing at Rosedale, in the county of Wyandotte and State of Kansas, have invented a certain new and useful Improvement in Emergency-Tires, of which the following is a specification.

My invention relates to improvements in emergency tires.

It is particularly adapted for use as an emergency tire on an automobile wheel as a substitute for an injured pneumatic tire, but it is also well adapted for general use where a pneumatic or resilient tire is not desired.

One of the objects of my invention is to provide an emergency tire which may be readily and quickly substituted for a punctured pneumatic tire, which is simple in construction, durable, not liable to get out of order, and which may be readily carried on the machine.

The novel features of my invention are hereinafter fully described and claimed.

In the accompanying drawing, which illustrates the preferred embodiment of my invention, Figure 1 is a side elevation, partly broken away, of my improved emergency tire shown applied to an ordinary automobile wheel.

Fig. 2 is a top view of the same.

Fig. 3 is an enlarged sectional view on the line 3—3 of Fig. 1.

Fig. 4 is a cross section on the line 4—4 of Fig. 1.

Fig. 5 is a cross section on the line 5—5 of Fig. 1.

Similar reference characters designate similar parts in the different views.

1 designates two semi-circular arcuate sections, which may be of any suitable material, preferably wood, which are adapted for insertion into and to embrace an ordinary clencher rim 2 of an automobile wheel 3.

A transversely divided circular tread member 4 which is contractible and expansible, and which is, preferably, a flat metal band, such as steel or wrought iron, embraces the peripheries of the sections 1, to which the tread member is preferably attached by means of radial bolts 5, which extend through the tread member 4 and the sections 1 and are respectively provided at their inner ends with nuts 6 which are respectively located in recesses 7 provided on the inner sides of the sections 1.

As shown in Figs. 1 and 3, the tread member 4 has its ends bent around the adjacent ends of the sections 1 and also at the inner sides of said sections.

Attached to opposite sides of each section 1 at the end thereof adjacent to the ends of the tread member 4 are two angle plates 8. Each laterally extending arm of the angle plates 8 is provided with a bolt hole. Two bolts 9 disposed respectively at opposite sides of the sections 1 extend through the bolt holes of the lateral arms of the angle plates 8, thus connecting the adjacent ends of the sections 1. The bolts 9 are provided with nuts 10 which bear against the adjacent angle plates 8 and which may be turned so as to draw the two sections toward each other so as to cause the sections to tightly embrace the rim 2.

The sections 1 and the tread member 4 form a transversely divided expansible and contractible ring which, when mounted on the rim 2 will serve as an emergency tire.

In applying the emergency tire to a rim, the nuts 10 are removed from the bolts 9, after which the bolts may be withdrawn from the angle plates 8. The free ends of the emergency tire may then be swung apart sufficiently to permit the tire to be slipped over the rim 2, after which the bolts and nuts are replaced and the nuts then tightened sufficiently to cause the sections 1 to tightly embrace the rim 2.

When it is desired to remove the emergency tire, the nuts 10 and bolts 9 are removed and the tire is then expanded sufficiently to permit its being slipped laterally off from the rim 2.

The flat band 4 serves the double function of a tread member and of holding the sections 1 clamped to the rim. By having its ends bent around the adjacent ends of the sections and formed into return bends at the inner sides of the sections, as shown in Fig. 1, a very strong structure is afforded for preventing the bolts which connect the angle plate 8 from fracturing or splitting off the ends of the sections to which the angle plates are attached.

I do not limit my invention to the structure shown and described, as many modifications, within the scope of the appended claim, may be made without departing from the spirit of my invention.

What I claim is:—

An emergency tire comprising sections adapted to embrace a wheel rim, a transversely divided circular metal tread member adapted to embrace the peripheries of said sections and having its ends bent around the adjacent ends of said sections and extending in return bends at the inner sides of said sections, and releasable adjustable means for drawing said sections tightly against the rim.

In testimony whereof I have signed my name to this specification.

LOVELL D. STUART.